(12) United States Patent
Nguyen

(10) Patent No.: US 12,561,075 B2
(45) Date of Patent: Feb. 24, 2026

(54) SECURE STORING AND RETRIEVAL OF SENSITIVE DATA FROM A SERVER SYSTEM

(71) Applicant: T-Mobile USA, Inc., Bellevue, WA (US)

(72) Inventor: Phi Hoang Nguyen, Lacey, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 60 days.

(21) Appl. No.: 18/761,126

(22) Filed: Jul. 1, 2024

(65) Prior Publication Data

US 2026/0003516 A1      Jan. 1, 2026

(51) Int. Cl.
G06F 3/06 (2006.01)

(52) U.S. Cl.
CPC .......... G06F 3/0622 (2013.01); G06F 3/0655 (2013.01); G06F 3/067 (2013.01)

(58) Field of Classification Search
CPC ....... G06F 3/0622; G06F 3/0655; G06F 3/067
See application file for complete search history.

(56) References Cited

U.S. PATENT DOCUMENTS

| | | | |
|---|---|---|---|
| 7,362,868 B2 | 4/2008 | Madoukh et al. | |
| 7,434,069 B2 | 10/2008 | Nessler | |
| 7,502,472 B2 | 3/2009 | Depta | |
| 7,757,278 B2 | 7/2010 | Boneh et al. | |

| | | | |
|---|---|---|---|
| 7,849,514 B2 | 12/2010 | Usov et al. | |
| 7,861,096 B2 | 12/2010 | Staddon et al. | |
| 7,971,240 B2 | 6/2011 | Guo et al. | |
| 8,200,972 B2 | 6/2012 | Chandran et al. | |
| 8,254,891 B2 | 8/2012 | Mishra | |
| 8,386,768 B2 | 2/2013 | Nair et al. | |
| 8,438,647 B2 | 5/2013 | Jevans | |
| 8,447,990 B2 | 5/2013 | Utin | |
| 8,458,468 B2 | 6/2013 | Leone et al. | |
| 8,458,494 B1 | 6/2013 | Bogorad | |

(Continued)

FOREIGN PATENT DOCUMENTS

| | | |
|---|---|---|
| CN | 101098224 B | 8/2010 |
| CN | 103220141 B | 7/2016 |

(Continued)

*Primary Examiner* — Jonathan A Bui
(74) *Attorney, Agent, or Firm* — Perkins Coie LLP

(57) ABSTRACT

A method includes receiving a request from a data requester device by a server system to retrieve sensitive data associated with a customer. Decryption of the sensitive data can require a composite decryption key specific for the encrypted sensitive data. The method can include retrieving the encrypted sensitive data, a login session identifier associated with the encrypted sensitive data, at least one attribute associated with the data requester, and a decryption algorithm. The login session identifier, the at least one attribute associated with the data requester, and the decryption algorithm are required for generating the composite decryption key for decrypting the encrypted sensitive data. The method includes generating the composite decryption key and decrypting the encrypted sensitive data by the server system based on the composite decryption key. The method can include providing the decrypted sensitive data to the data requester device to be revealed.

20 Claims, 8 Drawing Sheets

(56) References Cited

U.S. PATENT DOCUMENTS

| | | | |
|---|---|---|---|
| 8,997,197 B2 | 3/2015 | Nord et al. | |
| 9,424,439 B2 | 8/2016 | Tamayo-Rios et al. | |
| 9,621,344 B2 | 4/2017 | Machani | |
| 9,639,687 B2 | 5/2017 | Sullivan | |
| 9,639,705 B1 | 5/2017 | Baer et al. | |
| 9,673,975 B1 | 6/2017 | Machani | |
| 9,832,171 B1 | 11/2017 | Roth et al. | |
| 9,875,374 B2 | 1/2018 | Brownewell et al. | |
| 9,917,817 B1 | 3/2018 | Lad et al. | |
| 9,930,026 B2 | 3/2018 | Shoshan | |
| 9,934,400 B2 | 4/2018 | Gilbert | |
| 9,959,413 B2 | 5/2018 | Ryhorchuk et al. | |
| 9,973,484 B2 | 5/2018 | Reid et al. | |
| 10,073,985 B2 | 9/2018 | Broumas | |
| 10,147,089 B2 | 12/2018 | Powell et al. | |
| 10,560,476 B2 | 2/2020 | Burgess et al. | |
| 10,699,023 B1 | 6/2020 | Mokashi et al. | |
| 10,860,724 B2 | 12/2020 | Pearson et al. | |
| 11,216,570 B2 | 1/2022 | Prokop et al. | |
| 11,301,865 B2 | 4/2022 | Tang et al. | |
| 11,394,543 B2 | 7/2022 | Collier et al. | |
| 11,520,905 B2 | 12/2022 | Valecha et al. | |
| 11,582,221 B1* | 2/2023 | Raj | H04L 63/06 |
| 11,698,979 B2 | 7/2023 | Hamel et al. | |
| 2002/0178366 A1 | 11/2002 | Ofir | |
| 2003/0021417 A1 | 1/2003 | Vasic et al. | |
| 2003/0188181 A1 | 10/2003 | Kunitz et al. | |
| 2006/0005017 A1 | 1/2006 | Black et al. | |
| 2008/0044030 A1 | 2/2008 | Mishra | |
| 2008/0104403 A1* | 5/2008 | Gueron | H04L 9/3247 |
| | | | 713/181 |
| 2009/0276514 A1 | 11/2009 | Subramanian | |
| 2010/0266132 A1 | 10/2010 | Bablani et al. | |
| 2012/0210126 A1 | 8/2012 | Johnson et al. | |
| 2014/0108785 A1* | 4/2014 | Lindteigen | H04L 9/0861 |
| | | | 713/156 |
| 2017/0109795 A1 | 4/2017 | Wilson | |
| 2018/0332471 A1* | 11/2018 | Zhu | H04L 63/061 |
| 2019/0005470 A1* | 1/2019 | Uhr | H04L 9/3239 |
| 2019/0296900 A1 | 9/2019 | Sitges Puy et al. | |
| 2020/0110887 A1 | 4/2020 | Kumar et al. | |
| 2020/0259660 A1* | 8/2020 | Tewari | H04L 9/3236 |
| 2021/0306139 A1* | 9/2021 | Wright | H04L 9/0869 |
| 2022/0014365 A1* | 1/2022 | Sofia | H04L 63/102 |
| 2022/0158829 A1 | 5/2022 | Parkhill et al. | |
| 2022/0300639 A1 | 9/2022 | Bellman et al. | |
| 2022/0303249 A1 | 9/2022 | Imabayashi et al. | |
| 2023/0041437 A1 | 2/2023 | Sloane et al. | |
| 2023/0116631 A1 | 4/2023 | Le Bouthillier et al. | |
| 2023/0125608 A1 | 4/2023 | Roeder et al. | |
| 2023/0393762 A1* | 12/2023 | Liu | H04L 9/0838 |
| 2024/0143212 A1* | 5/2024 | Tagra | G06F 3/0641 |
| 2024/0160751 A1 | 5/2024 | Leoutsarakos | |
| 2024/0163088 A1 | 5/2024 | Leoutsarakos | |

FOREIGN PATENT DOCUMENTS

| | | |
|---|---|---|
| CN | 105933117 A | 9/2016 |
| CN | 111104691 A | 5/2020 |
| CN | 111107066 A | 5/2020 |
| CN | 111079128 B | 9/2021 |
| CN | 109995712 B | 10/2021 |
| CN | 113536327 A | 10/2021 |
| CN | 113849847 B | 3/2022 |
| CN | 114884697 B | 12/2023 |
| CN | 114826612 B | 1/2024 |
| CN | 113722726 B | 4/2024 |
| CN | 113992345 B | 5/2024 |
| CN | 114826729 B | 5/2024 |
| DE | 102005012878 B4 | 9/2018 |
| EP | 1108308 B1 | 11/2005 |
| EP | 2503480 A1 | 9/2012 |
| EP | 3251284 A1 | 12/2017 |
| EP | 3259868 A2 | 12/2017 |
| EP | 2414983 B1 | 1/2018 |
| EP | 2839407 B1 | 9/2018 |
| EP | 3198907 B1 | 4/2019 |
| EP | 1946478 B1 | 10/2019 |
| EP | 3556074 A1 | 10/2019 |
| EP | 3453135 B1 | 5/2021 |
| EP | 3883177 B1 | 7/2022 |
| EP | 3398073 B1 | 3/2023 |
| JP | 2005166033 A | 6/2005 |
| JP | 2008250369 A | 10/2008 |
| JP | 2010141596 A | 6/2010 |
| JP | 2020161945 A | 10/2020 |
| KR | 101824980 B1 | 2/2018 |
| KR | 102651820 B1 | 3/2024 |
| WO | 2005045686 A1 | 5/2005 |
| WO | 2009018513 A1 | 2/2009 |
| WO | 2012064378 A1 | 5/2012 |
| WO | 2016156737 A1 | 10/2016 |
| WO | 2017210563 A1 | 12/2017 |
| WO | 2018017168 A2 | 1/2018 |
| WO | 2018099577 A1 | 6/2018 |
| WO | 2018231519 A1 | 12/2018 |
| WO | 2020055567 A1 | 3/2020 |
| WO | 2020086197 A1 | 4/2020 |
| WO | 2020117735 A1 | 6/2020 |
| WO | 2021017128 A1 | 2/2021 |
| WO | 2021021376 A1 | 2/2021 |
| WO | 2021021942 A1 | 2/2021 |
| WO | 2021133493 A1 | 7/2021 |
| WO | 2021201859 A1 | 10/2021 |
| WO | 2022002352 A1 | 1/2022 |

* cited by examiner

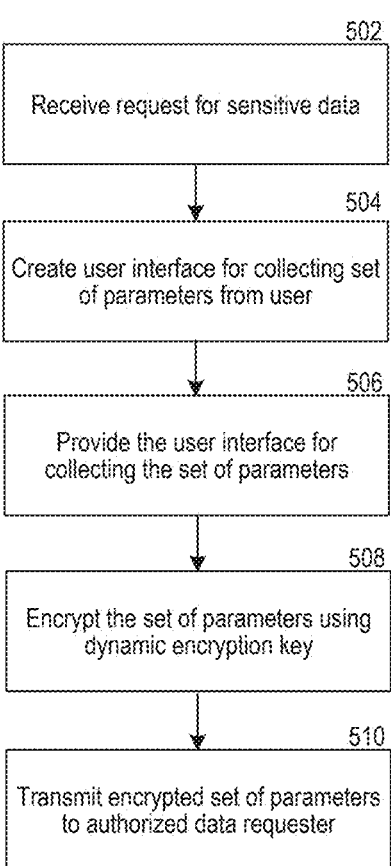
502
Receive request for sensitive data
504
Create user interface for collecting set of parameters from user
506
Provide the user interface for collecting the set of parameters
508
Encrypt the set of parameters using dynamic encryption key
510
Transmit encrypted set of parameters to authorized data requester
*FIG. 5*

700

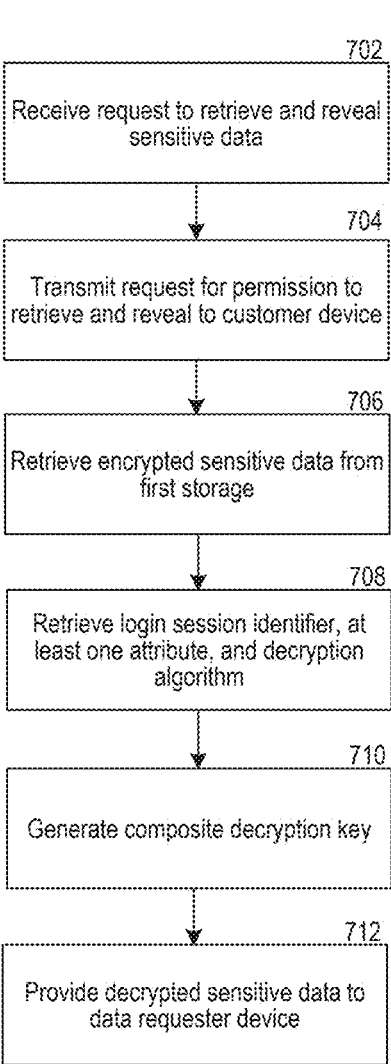

702

Receive request to retrieve and reveal sensitive data

704

Transmit request for permission to retrieve and reveal to customer device

706

Retrieve encrypted sensitive data from first storage

708

Retrieve login session identifier, at least one attribute, and decryption algorithm

710

Generate composite decryption key

712

Provide decrypted sensitive data to data requester device

*FIG. 7*

SECURE STORING AND RETRIEVAL OF SENSITIVE DATA FROM A SERVER SYSTEM

BACKGROUND

Companies routinely collect a wide array of personal information from individuals through their wireless devices (e.g., laptops, tablet computers, smart phones, and augmented reality/virtual reality (AR/VR) headsets). The personal information can range from basic details such as names and addresses to more sensitive data including Social Security numbers (SSNs), birth dates, or financial information. For example, financial information is collected from an individual making an online purchase.

Generally storing large amounts of customer data can give rise to certain risks. Data breaches can occur if a company's security measures are compromised, exposing sensitive information and leading to identity theft and financial fraud. Unauthorized access can cause misuse of sensitive data. Companies must also comply with regulations like the General Data Protection Regulation (GDPR) and consumer privacy regulations to avoid severe penalties. Additionally, there is a risk of data misuse and profiling, where companies might use data for targeted advertising or sell it without customer consent, infringing on privacy rights. Storing personal data also increases vulnerability to cyberattacks, necessitating robust cybersecurity measures. The protection of personal information is therefore important for safeguarding individual privacy, maintaining trust, ensuring legal compliance, and preventing various forms of harm and exploitation (e.g., identity theft).

BRIEF DESCRIPTION OF THE DRAWINGS

Detailed descriptions of implementations of the present invention will be described and explained through the use of the accompanying drawings.

FIG. 5 is a block diagram illustrating secure exchange of sensitive data between an organization and a user device.

FIG. 7 is a flow diagram that illustrates processes for secure storage and reveal of sensitive data from a server system.

Figure 1:
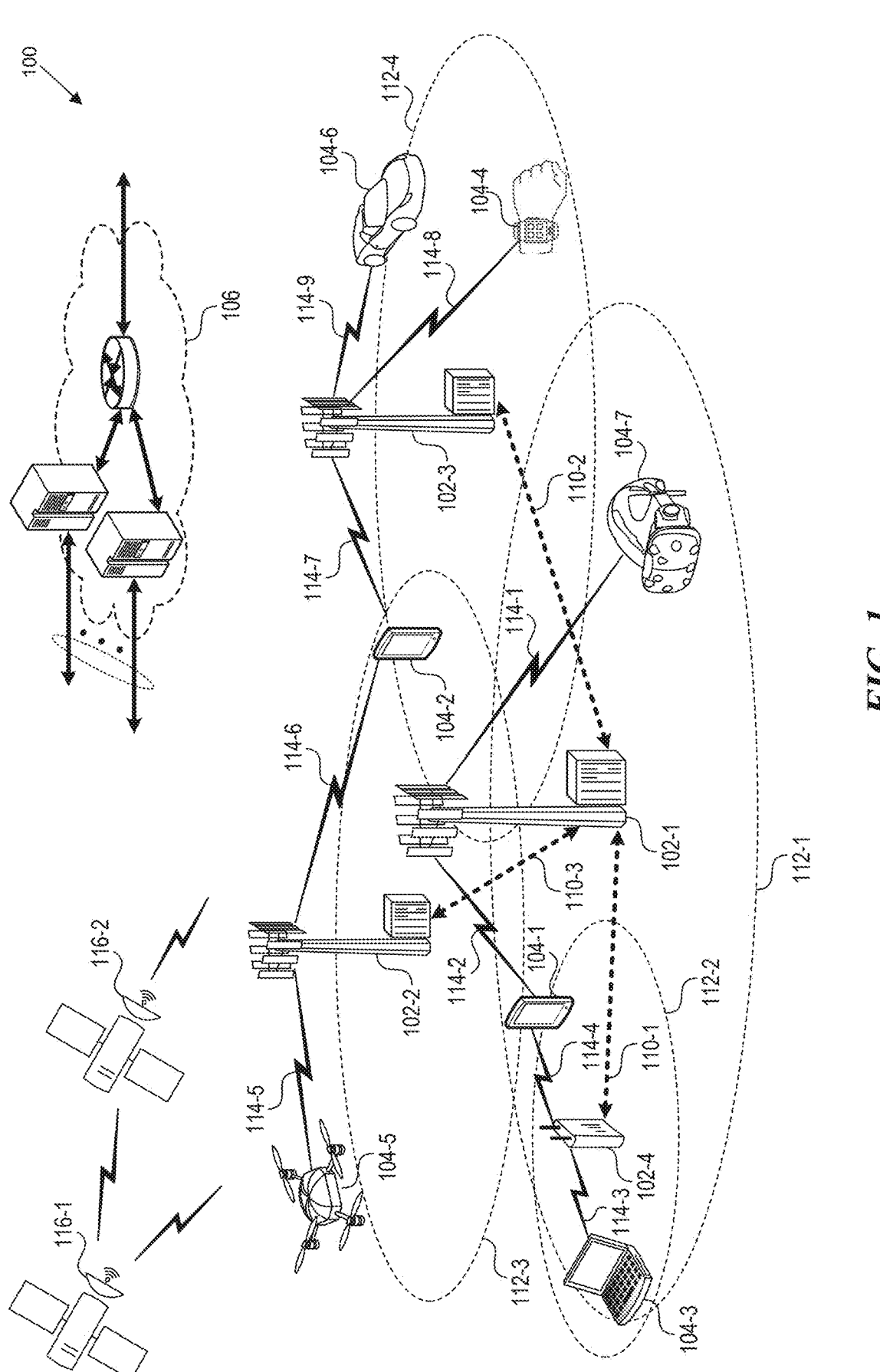
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The present technology provides for a method and system for securely collecting sensitive data from a user via a user device. In the present technology, sensitive data is collected and encrypted directly at a user device (e.g., a smart phone, a laptop, or a tablet computer). An authorized party (e.g., a company) can request sensitive data from a user by transmitting a request. The request includes information for encrypting the sensitive data. In particular, the information for encrypting the sensitive data can include a dynamic encryption key which is generated by the authorized party based on a login session (e.g., the user has logged onto an application associated with the company of the user device). The information for encrypting the sensitive data can also include, for example, company tokens or identifiers and an encryption algorithm. The user device can collect the sensitive data, encrypt the data, and transmit the encrypted sensitive data to the authorized party.

In one example, a computer-implemented method for secure collection of sensitive data at a computer device includes receiving from an authorized data requester by the computer device a request for sensitive data. The request can indicate a set of parameters to be collected at the computer device. The set of parameters can include sensitive information associated with a user of the computer device. The request for sensitive data can include a dynamic encryption key. The dynamic encryption key can be generated by the authorized data requester based on a login session identifier so that the dynamic encryption key is unique to the user of the computer device and the login session identifier. The method can include creating a user interface by a generative artificial intelligence (AI) software of the computer device. The user interface can be for collecting the set of parameters from the user. The user interface can be created based on the request indicating the set of parameters and the authorized data requester. The generative AI software can be integrated into an operating system or a hardware chip of the computer device. The method can include providing the user interface for collecting the set of parameters via the computer device. Responsive to collecting the set of parameters from the user, the method can include encrypting the set of parameters using the dynamic encryption key and an encryption algorithm associated with the authorized data requester by the computer device. The method can include transmitting the encrypted set of parameters to the authorized data requester to be decrypted.

In another example, a computer device for secure collection of sensitive data receives a request for sensitive data from an authorized data requester by the computer device. The request can indicate a set of parameters to be collected at the computer device. The request for sensitive data can include a dynamic encryption key. The dynamic encryption key can be generated by the authorized data requester based on a login session identifier so that the dynamic encryption key is unique to a user of the computer device and the login session identifier. The computer device can provide a user interface for collecting the set of parameters via the computer device. Responsive to collecting the set of parameters from the user, the computer device can encrypt the set of parameters using the dynamic encryption key and an encryption algorithm associated with the authorized data requester.

The computer device can transmit the encrypted set of parameters to the authorized data requester to be decrypted.

In yet another example, a server device associated with a software application operated on a computer device detects that a user has logged on to the software application operating on the computer device to initiate a login session. The server device can create a login session identifier based on the login session and a dynamic encryption key based on the login session identifier so that the dynamic encryption key is unique to the user of a computer device and the login session identifier. A decryption key associated with the dynamic encryption key can be stored by the server device. The server device can transmit to the computer device a request for sensitive data. The request can indicate a set of parameters to be collected at the computer device. The set of parameters can include sensitive information associated with a user of the computer device. The request for sensitive data can include the dynamic encryption key. The server system can receive the set of parameters encrypted by the computer device based on the dynamic encryption key from the computer device. The server device can decrypt the encrypted set of parameters using the decryption key and an encryption algorithm.

The present technology provides for a method and server system for securely storing sensitive customer data that has been received, as encrypted data, from a user device. Specifically, the present technology stores the encrypted data separate from the information required for decrypting the encrypted data. For example, the encrypted sensitive data is stored at one data storage while a decryption algorithm and company- and customer-related identifiers and tokens are stored at one or more data storage that are separate from the data storage including the encrypted sensitive data. In order to retrieve and reveal the stored sensitive data, the server system will retrieve the encrypted sensitive data and the information required for decrypting the data from the separate data storages. In some implementations, the server system is further configured to request the user's permission for retrieving and revealing the data prior to decrypting the sensitive data.

In one example, a computer-implemented method includes receiving a request to retrieve sensitive data associated with a customer by a server system from a data requester device. The sensitive data can be encrypted and stored in a first data storage. Decryption of the sensitive data can require a composite decryption key specific for the encrypted sensitive data. The method can include transmitting a request for a permission to retrieve the sensitive data by the server system to a customer device including a software application associated with the data requester. Responsive to receiving the permission to retrieve the sensitive data from the customer device, the method can include retrieving the encrypted sensitive data from the first data storage by the server system. The method can include retrieving by the server system a login session identifier associated with the encrypted sensitive data from a second data storage, at least one attribute associated with the data requester from a third data storage, and a decryption algorithm. The login session identifier, the at least one attribute associated with the data requester, and the decryption algorithm can be required for generating the composite decryption key for decrypting the encrypted sensitive data. The method can include generating the composite decryption key and decrypting the encrypted sensitive data by the server system based on the composite decryption key. The method can include providing the decrypted sensitive data to the data requester device to be revealed.

In another example, a system is caused to receive a request to retrieve sensitive data associated with a customer from a data requester device. The sensitive data can be encrypted and stored in a first data storage. Decryption of the sensitive data can require a composite decryption key specific for the encrypted sensitive data. The system can retrieve the encrypted sensitive data from the first data storage. The system can also retrieve a login session identifier associated with the encrypted sensitive data from a second data storage, at least one attribute associated with the data requester from a third data storage, and a decryption algorithm. The login session identifier, the at least one attribute associated with the data requester, and the decryption algorithm can be required for generating the composite decryption key for decrypting the encrypted sensitive data. The system can generate the composite decryption key. The system can decrypt the encrypted sensitive data based on the composite decryption key. The system can provide the decrypted sensitive data to the data requester device to be revealed.

In yet another example, a non-transitory, computer-readable storage medium can include instructions recorded which, when executed by at least one data processor of a computer device, cause a system to receive a request to retrieve sensitive data associated with a customer from a data requester device. The sensitive data can be encrypted and stored in a first data storage. Decryption of the sensitive data can require a composite decryption key specific for the encrypted sensitive data. The system can be caused to retrieve the encrypted sensitive data from the first data storage. The system can also be caused to retrieve a login session identifier associated with the encrypted sensitive data from a second data storage, at least one attribute associated with the data requester from a third data storage, and a decryption algorithm. The login session identifier, the at least one attribute associated with the data requester, and the decryption algorithm can be required for generating the composite decryption key for decrypting the encrypted sensitive data. The system can be caused to generate the composite decryption key. The system can be caused to decrypt the encrypted sensitive data based on the composite decryption key. The system can be caused to provide the decrypted sensitive data to the data requester device to be revealed.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Wireless Communications System

FIG. 1 is a block diagram that illustrates a wireless telecommunications network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

5G Core Network Functions

Figure 2:
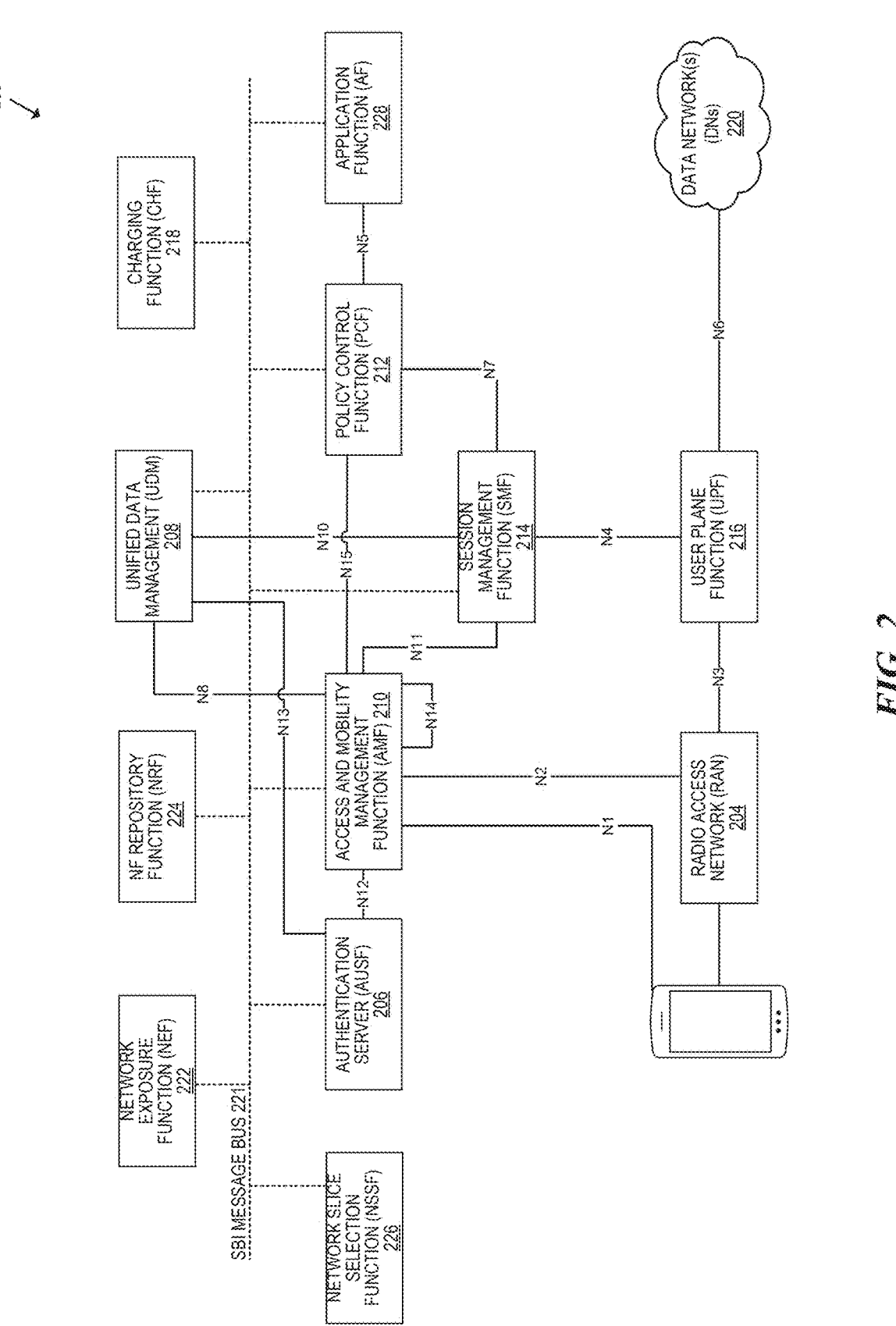
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Secure Collection of Sensitive Data

Figure 3:
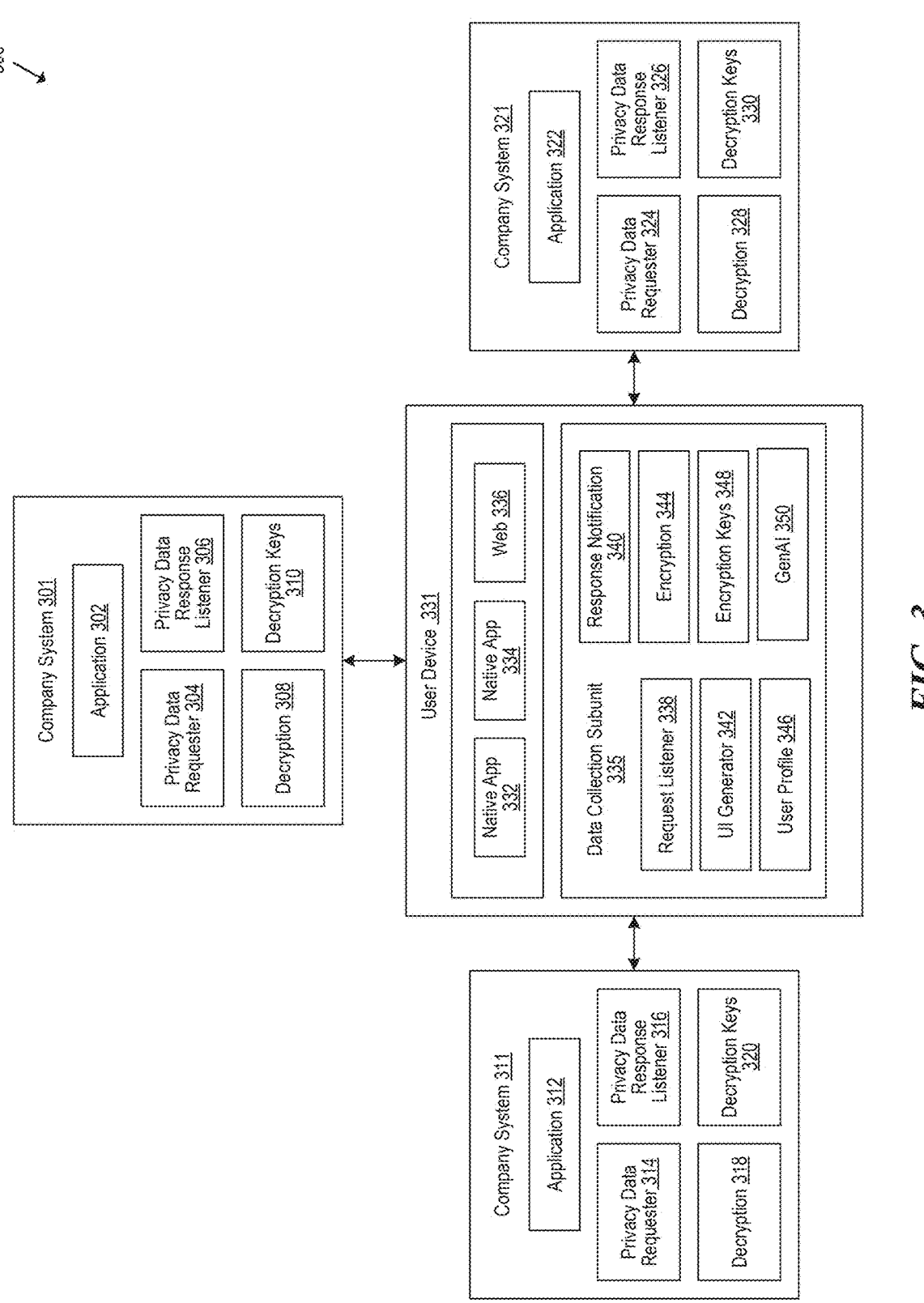
FIG. 3 is a block diagram illustrating an environment for exchanging of data between organizations and a user device.

FIG. 3 is a block diagram illustrating an environment 300 for exchanging of data between organizational devices and a user device (e.g., a customer device). The environment 300 facilitates a secure exchange of sensitive data between the user device and different organizations in accordance with the secure data collection method of the present disclosure. In FIG. 3, the environment 300 can include a user device 331 in wireless communication with multiple company systems (e.g., company systems 301, 311, and 321). The user device 331 and the company systems 301, 311, and 321 can be computer devices or computer systems (e.g., the computer system 800 in FIG. 8). The user device 331 can correspond to any of the wireless devices 104-1 through 104-7 described with respect to FIG. 1 and be in communication with the company systems 301, 311, and 321 via a wireless network (e.g., as described with respect to FIG. 1). In some implementations, the user device 331 can be associated with a user (e.g., a customer) of the organizations associated with the company systems 301, 311, and 321. The company systems 301, 311, and 321 can be, for example, service providers, online stores, organizations (e.g., healthcare, finance, insurance), or any other parties that have an interest to request sensitive information from a user of the user device 331.

The user device 331 can include multiple native software applications (e.g., native applications 332 and 334 also referred to as "native apps"). Native software applications can be applications specifically built for a wireless device's operating system (e.g., iOS or Android). They can be downloaded from an application store and can be accessed directly from the operating system (e.g., an icon on a home user interface of a wireless device). The native applications 332 and 334 can be associated with the company systems (e.g., the company systems 301, 311, and/or 321). For example, the company system 301 can be an online store and the native app 332 can be a software application associated with the online store. A user can purchase items offered by the online store conveniently via the native app 332.

The user device 331 can also include a web browser 336 configured for accessing the Internet. A user can access multiple web applications through the web browser. The user device 331 further includes data collection subunit 335. The data collection subunit 335 can be integrated into an operating system or a hardware chip of the user device 331. The data collection subunit 335 can have multiple components including a request listener 338, a user interface (UI) generator 342, a user profile 346, a response notification 340, an encryption tool 344, encryption keys 348, and a generative AI (GenAI) tool 350. The request listener 338 is configured to receive requests for collection of sensitive data received from the company systems 301, 311, and 321. The UI generator 342 can be configured to generate a user interface for requesting sensitive data from a user. For example, a user can provide inputs on a user interface to provide the requested sensitive data. In some implementations, the UI is generated using a built-in generative AI tool (e.g., the GenAI tool 350). The GenAI tool can include, for example, one or more large language models (LLMs) such as Generative Pre-trained Transformer 3 or 4 (GPT-3 or GPT-4), Bidirectional Encoder Representations from Transformers (BERT), Text-to-Text Transfer Transformer (T5), or any other LLM.

The data collection subunit 335 can include a user profile 346 that includes information associated with the user of the user device 331. The user profile 346 can include basic information (name, username, email address, phone number, etc.), personal information (date of birth (DOB), gender, home address, etc.), preferences (e.g., language, settings, etc.), activity and behavioral information (e.g., purchase history, login history, search history, etc.), social information (contacts, groups, communities, etc.), and/or security and authentication information (biometrics, security questions, etc.). The user profile 346 can include data that is associated with the user's interactions with the company systems 301, 311, and 321. The response notification 340 can be configured to receive and/or provide notifications when the user device 331 has responded to a data collection request. For example, the collected sensitive data has been transmitted to a data requester (e.g., the company systems 301, 311, and 321) that requested the sensitive data.

The data collection subunit 335 also includes the encryption tool 344 configured to encrypt the collected sensitive data before the data is transmitted to the data requester. The encryption keys 348 include encryption keys received from the data requesters together with the data request. The encryption keys 348 are dynamic and created based on a login session identifier (e.g., the user has initiated a login session) on a software application (e.g., the native applications 332 and 334 or a web application through the web browser 336). The encryption keys are therefore unique to the user of the user device 331 and the login session identifier.

The company systems 301, 311, and 321 represent authorized parties that are confirming to request and retrieve sensitive data from the user device 331 in accordance with a specified method (e.g., the company systems 301, 311, and 321 are also called authorized data requesters). The company systems 301, 311, and 321 can each include a software application (e.g., applications 302, 312, and 322), a privacy data requester (e.g., privacy data requesters 304, 314, and 324), a decryption tool (e.g., decryption tools 308, 318, and 328), a decryption key database (e.g., the decryption keys 310, 320, and 330), and a privacy data response listener (e.g., the privacy data response listeners 306, 316, and 326). Each of the company systems 301, 311, and 321 can include one or more server devices and/or one or more computer devices in communication with the one or more server devices. For example, the applications 302, 312, and 322 can be operating on a computer device while the privacy data requesters, privacy data response listeners, decryption tools, and decryption keys can be operating on a server device.

The application can be configured to interact with the user device to, for example, facilitate providing services or selling products. The privacy data requester is configured to create and transmit requests for sensitive data to the user device 331. The privacy data response listener 306 is configured to receive sensitive encrypted data from the user device 331 that is provided in response to a request from the privacy data requester 304. The decryption component is configured to decrypt the encrypted sensitive data received from the user device 331 using the decryption keys.

Figure 4:
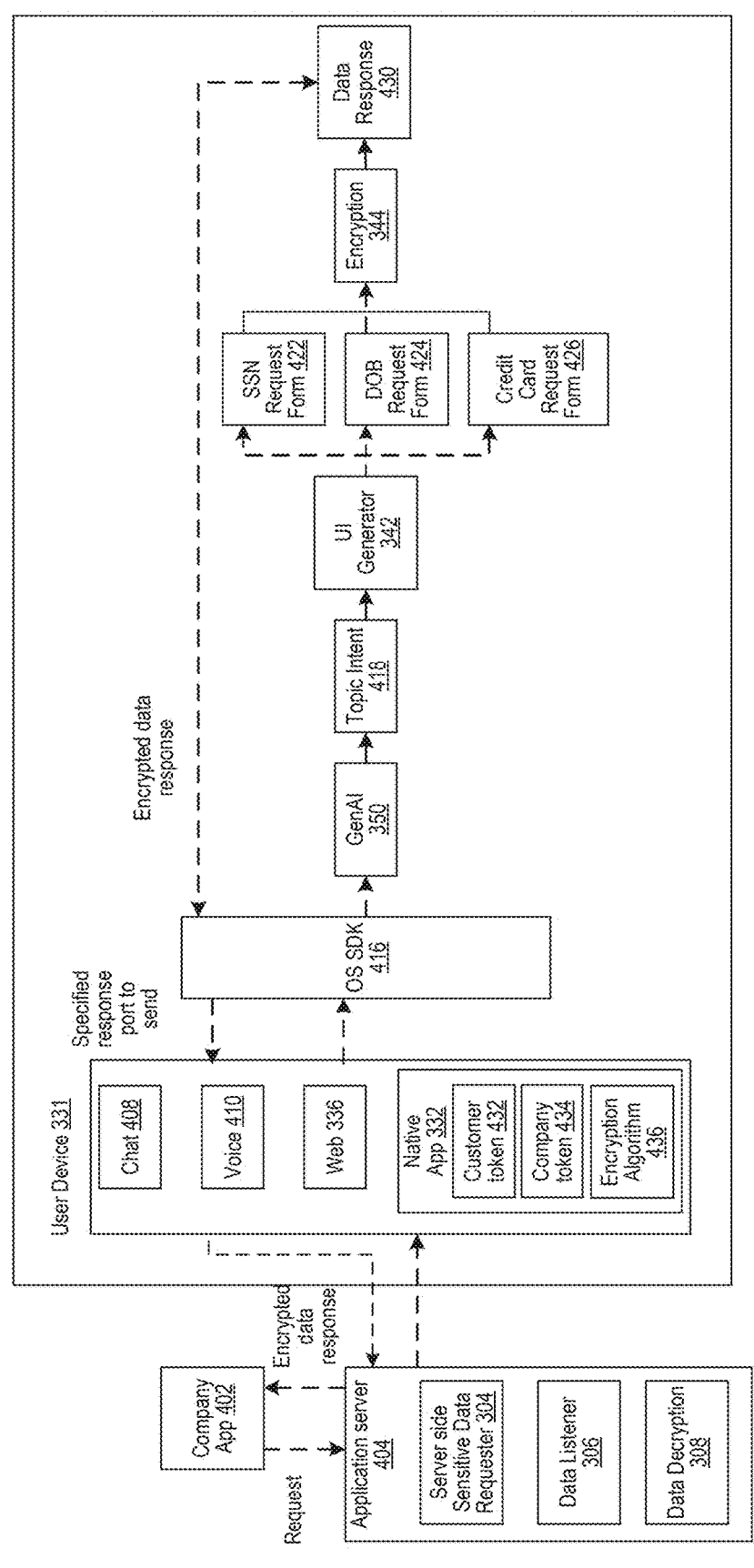
FIG. 4 is a block diagram illustrating a system for retrieval of sensitive data from a user device.

FIG. 4 is a block diagram illustrating a system 400 for retrieval of sensitive data from a user device. In FIG. 4, a request for retrieval of sensitive data can be initiated by a company application (also referred to as "company app") 402 (e.g., the company app 402 can correspond to any of the applications 302, 312, and 322 in FIG. 3). The request can be for retrieving sensitive data from a user associated with a user device 331. The company application 402 can transmit the request to a server including an application server 404 including a server-side data requester 304. The data requester 304 of the application server 404 can be configured to receive the request and transmit the request to the user device 331. The request from the data requester 304 of the application server 404 can be received by the user device 331. For example, the request is received by a web application on the web browser 336 or by a native application associated with the data requester 304 (e.g., the native application 332).

The user device 331 can also include a chat application 408 and a voice application 410 (e.g., a phone call application), as shown in FIG. 4. The chat application 408 and the voice application 410 can facilitate communication between a user and a company (e.g., through the company application 402) in addition to the application 332 and the web application 336. For example, the user can call an agent associated with the company using the voice application 410. As another example, the user can initiate a chat (e.g., an exchange of short messages) with an agent or an automated response service of the company using the chat application 408. The chat application 408 can be used for requesting sensitive data from the user. The data requester 304 can transmit the request for the sensitive data to the user via the chat application 408 similar to receiving the request by the native application 332 or the web application 336. As an example, a user can call a company agent to request for service using the voice application 410 and the agent can cause a request for sensitive data to be provided to the user via the chat application 408.

In some implementations, the request indicates a set of parameters to be collected from a user (e.g., a set of parameters including sensitive information). The request can further include unique identifiers or tokens (e.g., customer token 432 and a company token 434) and an encryption algorithm (e.g., an encryption algorithm 436) that is required for encrypting the sensitive data on the user device 331. The customer token 432 can include a login session identifier that is specific to the user device 331 and is created by the application server 404 in response to the user logging on to the native application 332 on the user device 331 (e.g., the native application 332 being associated with the application server 404). The company token 434 can include a domain name system (DNS) associated with the application server 404 and/or a server token associated with the application server 404. The server token can be uniquely related to the configuration of the application server 404. The DNS and the server token can be used as unique identifiers in communication between the application server 404 and other devices, such as the user device 331. In FIG. 4, the company token 434, the customer token 432, and the encryption algorithm 436 are illustrated to be associated with the native application 332 of the user device 331. The company token 434, the customer token 432, and the encryption algorithm 436 can be generated by the application server 404 and transmitted by the application server 404 to the native application 332 of the user device 331 together with the request to retrieve the sensitive data. For example, the customer token 432 can be generated by the application server 404 after a user has logged in to the native application 332 on the user device 331. The logging can require authentication, such as a password or a passcode, a facial recognition, a fingerprint recognition, a security question, or a combination thereof.

The request can be further transmitted to be processed by operating system software development kit (OS SDK) 416 of the user device 331 and further transmitted to GenAI tool 350. The GenAI tool 350 can process the request to extract, for example, an intent of the request (e.g., a topic intent 418) that can be used to generate a user interface to request the sensitive data from a user. The topic intent 418 is fed to the UI generator 342 so that the UI generator can generate a specific user interface (e.g., an electronic form to be displayed on the user device 331) configured to receive input from a user to collect the requested sensitive data. For example, the GenAI tool can identify that the sensitive data requested by the company application 402 includes a request for an SSN, a DOB, or credit card information. Accordingly, the UI generator 342 can generate one or more forms (or a single form including several requests) including, for example, an SSN request form 422, a date of birth (DOB) request form 424, or a credit card request form 426. Responsive to generating the one or more forms, the user device 331 displays the one or more forms to a user and the user can provide an input to provide the requested sensitive data in response to the request. The provided sensitive data is then encrypted by the encryption tool 344. The encrypted sensitive data can be provided by the encryption tool 344 to a data response tool 430 that transmits the encrypted sensitive data to the OS SDK 416. The encrypted sensitive data is then transmitted from the user device 331 to the data requester 304 of the application server 404, which transmits the encrypted sensitive data to the company application 402.

FIG. 5 is a flow diagram that illustrates processes 500 for the secure collection of sensitive data at a computer device. The processes 500 can be performed by a computer device (e.g., a computer system 800 in FIG. 8) including a software program for performing the processes 500. The device can include at least one hardware processor and at least one non-transitory memory storing instructions. When the instructions are executed by the at least one hardware processor, the device performs the processes 500.

At 502, the computer device (e.g., the user device 331 in FIG. 4) can receive a request for sensitive data from an authorized data requester. The authorized data requester can be associated with the company application 402 which is operating on a computer device. The request can be transmitted from the company application 402 to the application server 404 which then transmits the request to the user device 331. An authorized data requester is an organization that possesses the ability to collect sensitive data from a user via a user device using the processes 500. The authorization can be provided, for example, based on an agreement between the user and a company. For example, the authorized organization can be a service provider, an online store, an organization (e.g., a healthcare, finance, or insurance provider), or other organization and the user is a customer of the authorized organization.

The request can indicate a set of parameters to be collected at the computer device. The set of parameters can include sensitive information associated with a user of the computer device. The set of parameters can include basic information (name, username, email address, phone number, etc.), personal information (date of birth (DOB), gender, home address, etc.), preferences (e.g., language, settings, etc.), activity and behavioral information (e.g., purchase history, login history, search history, etc.), social information (contacts, groups, communities, etc.), and/or security and authentication information (biometrics, security questions, etc.).

The request for sensitive data can include a dynamic encryption key (e.g., the encryption keys 348). The dynamic encryption key can be generated by the authorized data requester based on a login session identifier so that the dynamic encryption key is unique to the user of the computer device and the login session identifier. The login session identifier can include a timestamped unique identifier (e.g., a customer token) associated with the user.

For example, the computer device can include a software application (e.g., the native application 332 in FIG. 3) associated with the authorized data requester. The login session identifier can correspond to a login session for the software application associated with the authorized data requester. The login session identifier can be created in response to a user logging on to a software application associated with the authorized data requester on the computer device. The authorized data requester can be configured to generate a different dynamic encryption key each time the user logs on to the software application (e.g., the login session identifier 614 includes timestamped customer tokens). Generating the dynamic, timestamped encryption keys increases the security of the encrypted data because the risk of compromising a large amount of data in an instance where a single encryption key is stolen is reduced.

At 504, the computer device (e.g., the UI generator 342 in FIG. 4) can create a user interface based on a generative AI (e.g., the GenAI tool 350 in FIG. 4) software of the computer device. The user interface can be for collecting the set of parameters from the user. For example, the SSN request form 422, the DOB request form 424, and the credit card request form 426 are user interfaces generated by the UI generator 342 for collecting sensitive data. The user interface can be created based on the request indicating the set of parameters and the authorized data requester. The generative AI software can be integrated into an operating system or a hardware chip of the computer device. For example, the GenAI tool 350 can be integrated into the hardware chip or the operating system of the user device 331.

At 506, the computer device can provide the user interface for collecting the set of parameters via the computer device. For example, the computer device provides the user interface on its display (e.g., a display device 818 in FIG. 8). In some implementations, the computer device can be configured to collect sensitive information from the user only through the AI-generated user interface and forgo collecting sensitive information through any other user interface. For example, the computer device is programmed to prevent any other processes from collecting sensitive data and be configured to facilitate sensitive data collection only using the user interface generated based on the process 500.

In some implementations, prior to providing the user interface for collecting the set of parameters, the computer device can perform an authentication on the user of the computer device to verify an identity of the user. The authentication can include, for example, a password or a passcode, facial recognition, fingerprint recognition, a security question, or a combination thereof. In some implementations, a multi-factor authentication (e.g., including two or more authentication methods listed above) is required to verify the identity of the user.

Responsive to collecting the set of parameters from the user, at 508, the computer device can encrypt (e.g., by the encryption tool 344 in FIG. 4) the set of parameters using the dynamic encryption key (e.g., the customer token 432, the company token 434, or a combination thereof) and an encryption algorithm (e.g., the encryption algorithm 436) associated with the authorized data requester by the computer device.

At 510, the computer device can transmit the encrypted set of parameters to the authorized data requester to be decrypted. In some implementations, the computer device can forgo storing the collected set of parameters. For example, after transmitting the encrypted sensitive data to the application server 404, the user device 331 removes the sensitive data from its memory. Forgoing the storing of the collected set of parameters (e.g., the sensitive data) improves the security of the collected data so that the data cannot be stolen from the computer device.

In some implementations, the request for sensitive data is received by the computer device through a first communication channel at a first time. The computer device can transmit the encrypted set of parameters through a second communication channel at a second time. The first communication channel and the first time can be different from and not associated with the second communication channel and the second time, respectively, so that the encrypted data and the dynamic encryption key are not transmitted at a same time and/or through a same communication channel. This asynchronous transmission increases the security of the process because it makes it more difficult for an attacker to intercept the sensitive data.

In some implementations, the computer device can cause decrypting the encrypted set of parameters by the authorized data requester. For example, the authorized data requester stores the information required for decrypting the data (e.g., the decryption keys 310, 320, and 330 in FIG. 3) and once it receives the encrypted sensitive data, the authorized data requester can decrypt the sensitive data. The decrypting is performed based on a decryption key and the decryption algorithm. The decryption key is associated with the dynamic encryption key and the decryption algorithm is associated with the encryption algorithm. The decryption key can be stored by the authorized data requester and no other device. For example, the ability to store the decryption key is only allowed for the authorized data requesters.

In some implementations, the computer device can cause generating the dynamic encryption key based on the login session identifier specific to the user of the computer device by the authorized data requester and further based on a domain name system (DNS) associated with the authorized data requester and/or a server token associated with the authorized data requester. For example, the dynamic encryption key can be based on the customer token 432 (e.g., including a login session identifier) and the company token 434 (e.g., including the DNS and/or the server token associated with the authorized data requester).

In some implementations, the computer device can further provide a different user interface associated with a software application associated with the authorized data requester. The request for the sensitive data can be received responsive to an event on the software application. The user interface for collecting the set of parameters can be provided concurrently, or instead of, providing the user interface for collecting the set of parameters. For example, in FIG. 4 the UI generator 342 can generate multiple user interfaces to request sensitive data (e.g., the SSN request form 422, the DOB request form 424, and the credit card request form 426). The request can be based on the set of parameters.

Secure Retrieval and Reveal of Sensitive Data

Figure 6:
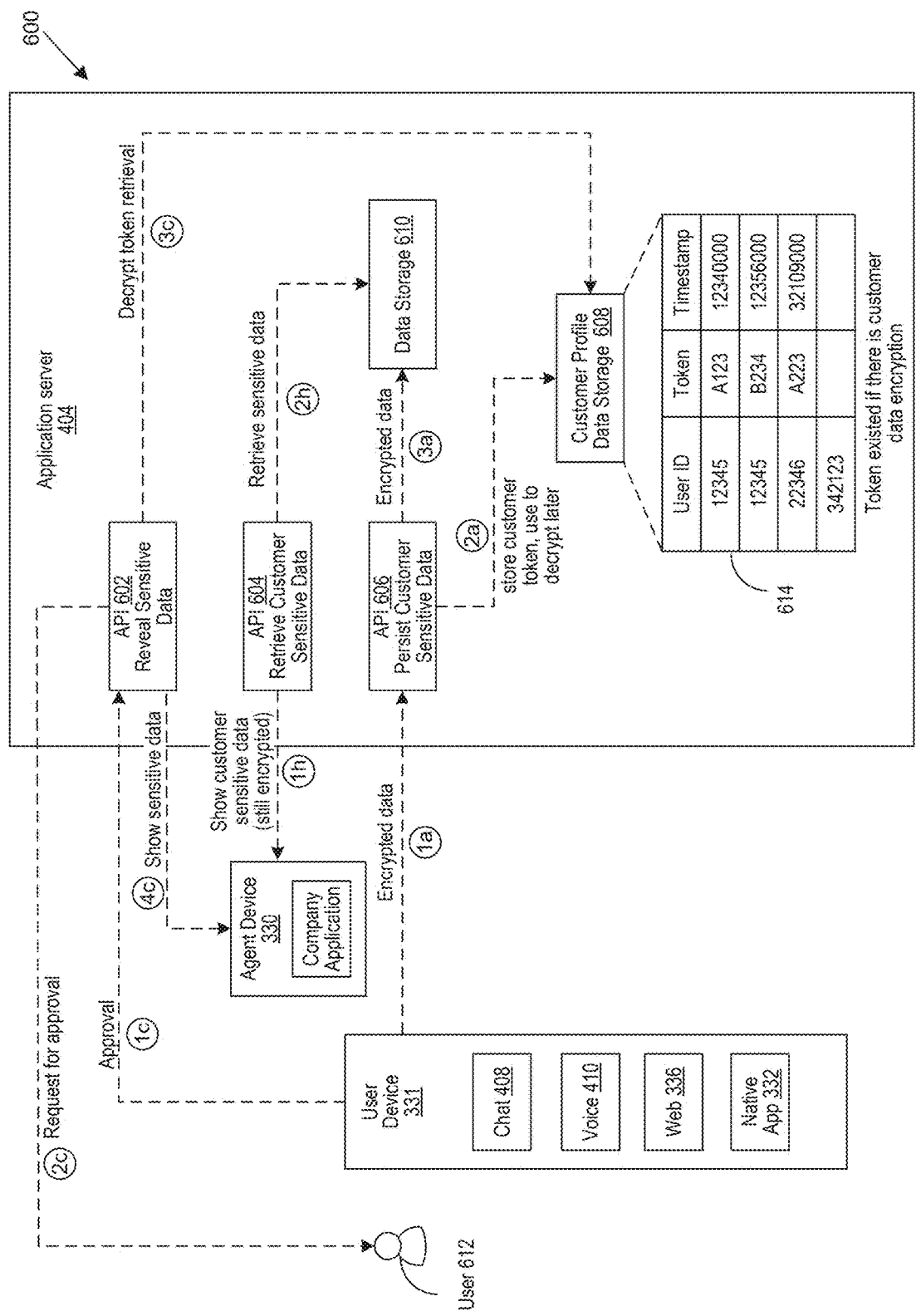
FIG. 6 is a block diagram illustrating a system for secure storage and retrieval of sensitive data from a server system.

FIG. 6 is a block diagram illustrating a system 600 for secure storage and retrieval of sensitive data at a server system. The system 600 can include the user device 331, the agent device 330, and the application server 404 described with respect to FIGS. 3 and 4. As described with respect to FIG. 4, the application server 404 can be configured to create a dynamic encryption key (e.g., including the customer token 432 and the company token 434) and an encryption algorithm (e.g., the encryption algorithm 436) which are provided to the user device 331 together with a request for retrieving sensitive data. The user device 331 can use the dynamic encryption key to encrypt the collected sensitive data (e.g., by the encryption tool 344). The user device 331 can provide the encrypted sensitive data to the application server 404 (e.g., an operation 1*a* in FIG. 6).

In some implementations, the application server 404 can receive the encrypted sensitive data from the user device 331 by a first API of the server system and store the received sensitive data in the first data storage. The encrypted data can be received by an application programming interface (API) 606 of the application server. In FIG. 6, the API 606 can store the encrypted sensitive data to a data storage 610 (e.g., an operation 3*a*). Importantly, the data can be stored as encrypted data (without decrypting).

Further, the application server 404 can store the information required to decrypt the encrypted data separately from the data storage 610. Storing the encrypted sensitive data separate from the information required to decrypt the sensitive data makes the storing more secure so that an unauthorized party attempting to retrieve the data would need to break into two or more data storages to be able to retrieve the encrypted sensitive data and the information to decrypt the sensitive data. For example, the decryption information includes a login session identifier which is based on the dynamic encryption key (e.g., encryption keys 348 in FIG. 1). The API 606 can store the login session identifier at a customer profile data storage 608 (e.g., an operation 2*a*). A login session identifier (e.g., the login session identifiers 614) can include customer tokens that are timestamped based on a time of creating the token and are uniquely associated with user identifiers. A customer token can be created by the application server 404 at the time a user logs on to the native application 332 associated with the application server 404 or at the time of creating and/or transmitting a request for the sensitive data. The information for decrypting the sensitive data can further include a decryption algorithm (e.g., a decryption algorithm associated with the encryption algorithm 436 in FIG. 4) and/or a company token (e.g., the company token 434 in FIG. 4). The company token and the decryption algorithm can be stored at the customer profile data storage 608 and/or in one or more separate data storages associated with the application server 404. In some implementations, the login session identifier 614, the company token, and the decryption algorithm can all be stored at separate data storages and separate from the data storage 610 storing the encrypted data.

In response to a request to retrieve the sensitive data (e.g., from the agent device 330), the application server 404 can retrieve the encrypted sensitive data from the data storage 610 (e.g., an operation 2*h*). The encrypted data can be retrieved by an API 604 which is different from the API 606. The application server 404 can also retrieve the information required to decrypt the encrypted sensitive data. For example, an API 602 which is separate from the API 604 and API 606 can retrieve the login session identifier from the customer profile data storage 608 (e.g., an operation 3*c*). The application server 404 can further retrieve the decryption algorithm and the company token required for decrypting the encrypted sensitive data and the application server 404 can accordingly decrypt the sensitive data and provide it to the company application 402.

In some implementations, as an additional security measure, the application server 404 can further require an approval from a user 612 associated with the user device 331 for retrieving the encrypted data. In FIG. 6, the API 602 transmits a request for approval to the user 612 of the user device 331 (e.g., an operation 2*c*). In some implementations, the request can include providing a user interface on the user device 331 that shows the customer the encrypted sensitive data retrieved by the API 604 from the data storage 610 and requests the user 612 to approve revealing the data to a data requester (e.g., the agent device 330). Once receiving the approval (e.g., an operation 1*c*), the application server 404 can decrypt the sensitive data and the API 602 of the application server 404 can provide the decrypted sensitive data to the agent device 330 (e.g., an operation 4*c*) to be decrypted and revealed.

FIG. 7 is a flow diagram that illustrates processes 700 for secure storage and retrieval of sensitive data from a server system. The processes 700 can be performed by a computer device (e.g., the computer system 800 in FIG. 8) including a software program for performing the processes 700. The device can include at least one hardware processor and at least one non-transitory memory storing instructions. When the instructions are executed by the at least one hardware processor, the device performs the processes 700.

At 702, the system (e.g., the application server 404 in FIG. 6) can receive a request to retrieve and reveal sensitive data associated with a customer (e.g., the user 612) from a data requester device (e.g., a device associated with the application server 404). The sensitive data can be encrypted and stored in a first data storage (e.g., the data storage 610). For example, the API 606 can receive the encrypted sensitive data from the user device 331 and stores the encrypted sensitive data to the data storage 610 (as encrypted data without decrypting the data). The decryption of the sensitive data can require a composite decryption key specific to the encrypted sensitive data.

At 704, the system can transmit a request for a permission to retrieve and reveal the sensitive data by the server system to a user device including a software application associated with the data requester. For example, the application server 404 can request the permission by sending a request to the user 612 (e.g., via the user device 331). In some implementations, receiving the permission to retrieve and reveal the sensitive data requires authentication of the customer on the user device (e.g., a password or a passcode, facial recognition, fingerprint recognition, a security question, or a combination thereof).

Responsive to receiving the permission to retrieve and reveal the sensitive data from the user device, at 706, the system can retrieve the encrypted sensitive data from the first data storage by the server system (e.g., the API 604 retrieves the encrypted sensitive data from the data storage 610 in FIG. 6).

At 708, the system can retrieve by the server system a login session identifier associated with the encrypted sensitive data from a second data storage, at least one attribute associated with the data requester from a third data storage, and a decryption algorithm. In some implementations, the at least one attribute associated with the data requester includes a domain name system (DNS) associated with the data requester and/or a server token associated with the server system. The login session identifier, the at least one attribute associated with the data requester, and the decryption algorithm can be required for generating the composite decryption key for decrypting the encrypted sensitive data.

In some implementations, the first data storage, the second data storage, and the third data storage are separate from each other. The first data storage, the second data storage, and the third data storage are separate from the server system and in communication with the server system via one or more application programming interfaces (APIs) so that the encrypted sensitive data, the composite decryption key, and the decryption algorithm are stored separately from each other.

For example, the API 606 can retrieve the login session identifier (e.g., the login session identifiers 614) from the customer profile data storage 608. The API 606 can further retrieve the at least one attribute from a third data storage that can be different from the data storage 610 and the customer profile data storage. The API 606 can further retrieve the decryption algorithm (e.g., from a fourth data storage). In some implementations, the encrypted data, the login session identifier, the at least one attribute, and the decryption algorithm are all stored at separate data storages. In some implementations, the encrypted data is stored separate from the login session identifier, the at least one attribute, and the decryption algorithm while the login session identifier, the at least one attribute, and the decryption algorithm are stored in one or more data storages.

At 710, the system can generate the composite decryption key and decrypt the encrypted sensitive data by the server system based on the composite decryption key. In some implementations, the composite decryption key is specific to the customer, the data requester, and the login session identifier. The requirements for the system to generate the composite decryption key based on the login session identifier, the at least one attribute, and the decryption algorithm, and optionally requiring an permission and authentication from the user, increases the security of the processes for storing encrypted data because it would be challenging for an attacker retrieve all required information for the composite decryption key.

At 712, the system can provide the decrypted sensitive data to the data requester device to be revealed. For example, the application server 404 can provide the decrypted sensitive data to a device including the company application 402 in FIG. 4.

In some implementations, the login session identifier (e.g., the login session identifiers 614) is timestamped according to the customer initiating a login session on a software application associated with the data requester on the user device. The method can further include storing the login session identifier and the associated timestamp to the second data storage (e.g., the customer profile data storage 608) by the server system responsive to receiving the login session identifier. The data storage can include multiple different login session identifiers and their associated timestamps received from the user device at different times.

In some implementations, prior to receiving the request to retrieve and reveal the sensitive data, the system receives the encrypted sensitive data from the user device (e.g., the application server 404 receives the encrypted sensitive data from the user device 331 in FIG. 6). The encrypted sensitive data can be encrypted by the user device based on a dynamic encryption key provided by the server system. The dynamic encryption key can be based on the login session identifier and the at least one attribute associated with the data requester.

In some implementations, prior to receiving the request to retrieve and reveal the sensitive data, the system can transmit a request for sensitive data and an encryption key to the user device (e.g., as described with respect to FIG. 4). The system can receive the encrypted sensitive data from the user device. The encrypted sensitive data can be encrypted by the user device based on the encryption key. The system can store the login session identifier, the at least one attribute associated with the data requester, and the decryption algorithm so that the login session identifier, the at least one attribute associated with the data requester, and the decryption algorithm are available for the creation of the composite decryption key at a later time.

In some implementations, the encrypted sensitive data is retrieved from the first data storage by a second API (e.g., the API 604 in FIG. 6) of the server system. The login session identifier, the at least one attribute associated with the data requester, and/or the decryption algorithm can be retrieved by a third API (e.g., the API 602 in FIG. 6) of the server system. The first API, second API, and third API can be different from each other.

Computer System

Figure 8:
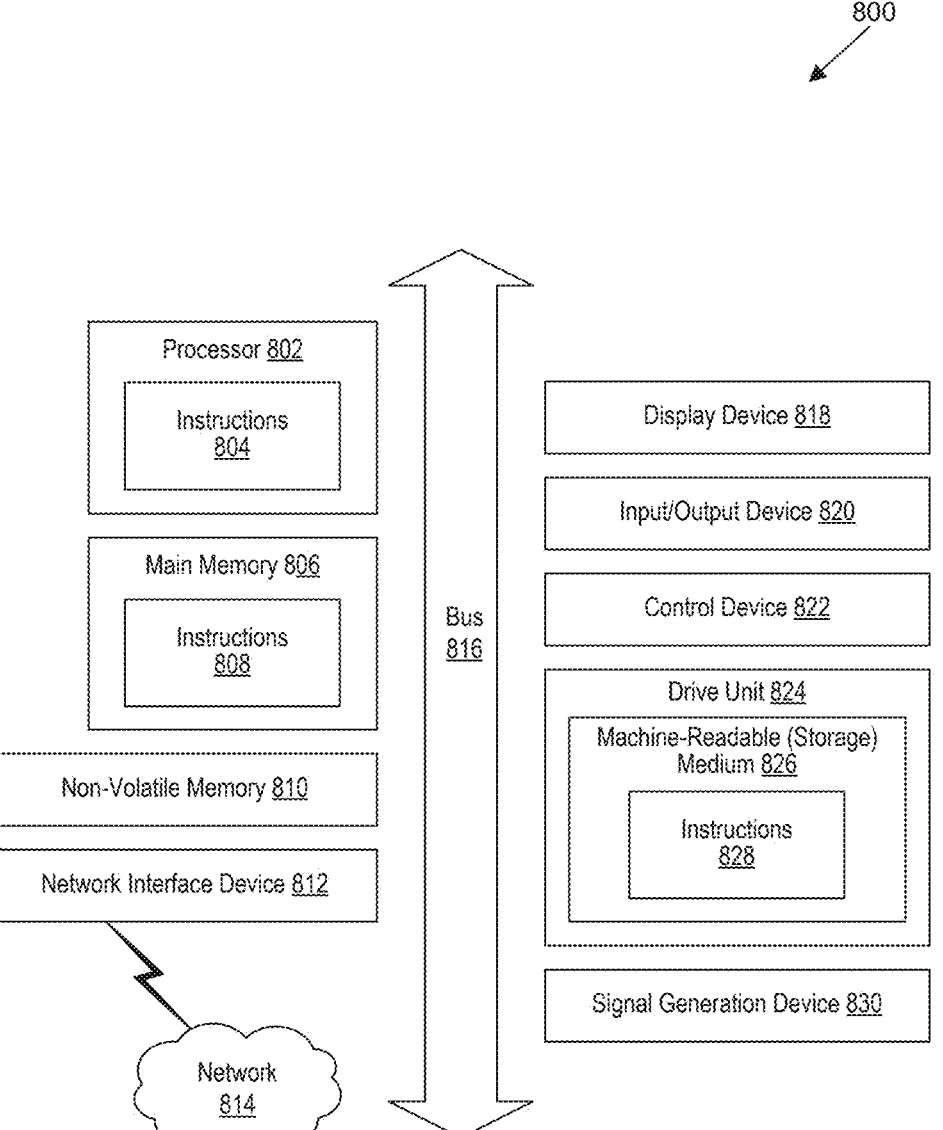
FIG. 8 is a block diagram that illustrates an example of a computer system in which at least some operations described herein can be implemented.

FIG. 8 is a block diagram that illustrates an example of a computer system 800 in which at least some operations described herein can be implemented. As shown, the computer system 800 can include: one or more processors 802, main memory 806, non-volatile memory 810, a network interface device 812, video display device 818, an input/output device 820, a control device 822 (e.g., keyboard and pointing device), a drive unit 824 that includes a storage medium 826, and a signal generation device 830 that are communicatively connected to a bus 816. The bus 816 represents one or more physical buses and/or point-to-point connections that are connected by appropriate bridges, adapters, or controllers. Various common components (e.g., cache memory) are omitted from FIG. 8 for brevity. Instead, the computer system 800 is intended to illustrate a hardware device on which components illustrated or described relative to the examples of the figures and any other components described in this specification can be implemented.

The computer system 800 can take any suitable physical form. For example, the computing system 800 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 800. In some implementation, the computer system 800 can be an embedded computer system, a system-on-chip (SOC), a single-board computer system (SBC) or a distributed system such as a mesh of computer systems or include one or more cloud components in one or more networks. Where appropriate, one or more computer systems 800 can perform operations in real-time, near real-time, or in batch mode.

The network interface device 812 enables the computing system 800 to mediate data in a network 814 with an entity that is external to the computing system 800 through any communication protocol supported by the computing system 800 and the external entity. Examples of the network interface device 812 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 806, non-volatile memory 810, machine-readable medium 826) can be local, remote, or distributed. Although shown as a single medium, the machine-readable medium 826 can include multiple media (e.g., a centralized/distributed database and/or associated caches and servers) that store one or more sets of instructions 828. The machine-readable (storage) medium 826 can include any medium that is capable of storing, encoding, or carrying a set of instructions for execution by the computing system 800. The machine-readable medium 826 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 810, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 804, 808, 828) set at various times in various memory and storage devices in computing device(s). When read and executed by the processor 802, the instruction(s) cause the computing system 800 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. A computer-implemented method for secure storage and retrieval of sensitive data from a server system, the method comprising:

receiving, by the server system from a data requester device, a request to retrieve sensitive data associated with a customer, wherein the sensitive data is encrypted and stored in a first data storage, and wherein decryption of the sensitive data requires a composite decryption key specific for the encrypted sensitive data;

transmitting, by the server system to a customer device including a software application associated with the data requester, a request for a permission to retrieve the sensitive data, responsive to receiving the permission to retrieve the sensitive data from the customer device, retrieving, by the server system, the encrypted sensitive data from the first data storage;

retrieving, by the server system, a login session identifier associated with the encrypted sensitive data from a second data storage, at least one attribute associated with the data requester from a third data storage, and a decryption algorithm, wherein the login session identifier, the at least one attribute associated with the data requester, and the decryption algorithm are required for generating the composite decryption key for decrypting the encrypted sensitive data;

generating the composite decryption key;

decrypting, by the server system, the encrypted sensitive data based on the composite decryption key; and providing the decrypted sensitive data to the data requester device to be revealed.

2. The computer-implemented method of claim 1, wherein the first data storage, the second data storage, and the third data storage are separate from each other, and wherein the first data storage, the second data storage, and the third data storage are separate from the server system and in communication with the server system via one or more application programming interfaces (APIs) so that the encrypted sensitive data, the composite decryption key, and the decryption algorithm are stored separate from each other.

3. The computer-implemented method of claim 1, wherein the login session identifier is timestamped according to the customer initiating a login session on a software application associated with the data requester on the customer device, and the method further comprises:

storing, by the server system, the login session identifier and the associated timestamp to the second data storage responsive to receiving the login session identifier, wherein the data storage includes multiple different login session identifiers and their associated timestamps received from the customer device at different times.

4. The computer-implemented method of claim 1, wherein receiving the permission to retrieve the sensitive data requires authentication of the customer on the customer device.

5. The computer-implemented method of claim 1, further comprising:

prior to receiving the request to retrieve the sensitive data, receiving the encrypted sensitive data from the customer device, wherein the encrypted sensitive data is encrypted by the customer device based a dynamic encryption key provided by the server system, and wherein the dynamic encryption key is based on the login session identifier and the at least one attribute associated with the data requester.

6. The computer-implemented method of claim 1, wherein the at least one attribute associated with the data requester includes a domain name system (DNS) associated with the data requester and/or a server token associated with the server system.

7. The computer-implemented method of claim 1, wherein the composite decryption key is specific to the customer, the data requester, and the login session identifier.

8. The computer-implemented method of claim 1, prior to receiving the request to retrieve the sensitive data, transmitting, by the server system, a request for sensitive data and an encryption key to the customer device, receiving, by the server system, the encrypted sensitive data from the customer device wherein the encrypted sensitive data is encrypted by the customer device based on the encryption key, and storing, by the server system, the login session identifier, the at least one attribute associated with the data requester, and the decryption algorithm so that the login session identifier, the at least one attribute associated with the data requester, and the decryption algorithm are available for the creation of the composite decryption key at a later time.

9. The computer-implemented method of claim 1, further comprising:

receiving the encrypted sensitive data, by a first application programming interface (API) of the server system, and storing, by the first API, the received sensitive data to the first data storage.

10. The computer-implemented method of claim 9, wherein the encrypted sensitive data is retrieved from the first data storage by a second API of the server system, wherein the login session identifier, the at least one attribute associated with the data requester, and/or the decryption algorithm is retrieved by a third API of the server system, and wherein the first API, second API, and third API are different from each other.

11. A system for storing and retrieving sensitive data, the system comprising:

at least one hardware processor, and

23 at least one non-transitory memory storing instructions, which, when executed by the at least one hardware processor, cause the system to:

receive, from a data requester device, a request to retrieve sensitive data associated with a customer, wherein the sensitive data is encrypted and stored in a first data storage, and wherein decryption of the sensitive data requires a composite decryption key specific for the encrypted sensitive data;

retrieve the encrypted sensitive data from the first data storage;

retrieve a login session identifier associated with the encrypted sensitive data from a second data storage, at least one attribute associated with the data requester from a third data storage, and a decryption algorithm, wherein the login session identifier, the at least one attribute associated with the data requester, and the decryption algorithm are required for generating the composite decryption key for decrypting the encrypted sensitive data;

generate the composite decryption key;

decrypt the encrypted sensitive data based on the composite decryption key; and provide the decrypted sensitive data to the data requester device to be revealed.

12. The system of claim 11, wherein the first data storage, the second data storage, and the third data storage are separate from each other, and wherein the first data storage, the second data storage, and the third data storage are separate from the system and in communication with the system via one or more application programming interfaces (APIs) so that the encrypted sensitive data, the composite decryption key, and the decryption algorithm are stored separate from each other.

13. The system of claim 11, wherein the login session identifier is timestamped according to the customer initiating a login session on a software application associated with the data requester on the customer device, and the system is further caused to:

storing, by the system, the login session identifier and the associated timestamp to the second data storage responsive to receiving the login session identifier, wherein the data storage includes multiple different login session identifiers and their associated timestamps received from the customer device at different times.

14. The system of claim 11, wherein the system is further caused to:

transmit, to a customer device including a software application associated with the data requester, a request for a permission to retrieve the sensitive data, wherein the encrypted sensitive data from the first data storage is retrieved responsive to receiving the permission to retrieve the sensitive data from the customer device.

15. The system of claim 11, wherein the at least one attribute associated with the data requester includes a domain name system (DNS) associated with the data requester and/or a server token associated with the system.

16. A non-transitory, computer-readable storage medium comprising instructions recorded thereon, wherein the instructions, when executed by at least one data processor of a computer device, cause a system to:

receive, from a data requester device, a request to retrieve sensitive data associated with a customer, wherein the sensitive data is encrypted and stored in a first data storage, and wherein decryption of the sensitive data requires a composite decryption key specific for the encrypted sensitive data;

retrieve the encrypted sensitive data from the first data storage;

retrieve a login session identifier associated with the encrypted sensitive data from a second data storage, at least one attribute associated with the data requester from a third data storage, and a decryption algorithm, wherein the login session identifier, the at least one attribute associated with the data requester, and the decryption algorithm are required for generating the composite decryption key for decrypting the encrypted sensitive data;

generate the composite decryption key;

decrypt the encrypted sensitive data based on the composite decryption key; and provide the decrypted sensitive data to the data requester device to be revealed.

17. The non-transitory, computer-readable storage medium of claim 16, wherein the first data storage, the second data storage, and the third data storage are separate from each other, and wherein the first data storage, the second data storage, and the third data storage are separate from the system and in communication with the system via one or more application programming interfaces (APIs) so that the encrypted sensitive data, the composite decryption key, and the decryption algorithm are stored separate from each other.

18. The non-transitory, computer-readable storage medium of claim 16, wherein the login session identifier is timestamped according to the customer initiating a login session on a software application associated with the data requester on the customer device, and the system is further caused to:

storing, by the system, the login session identifier and the associated timestamp to the second data storage responsive to receiving the login session identifier, wherein the data storage includes multiple different login session identifiers and their associated timestamps received from the customer device at different times.

19. The non-transitory, computer-readable storage medium of claim 16, wherein the system is further caused to:

transmit, to a customer device including a software application associated with the data requester, a request for a permission to retrieve the sensitive data, wherein the encrypted sensitive data from the first data storage is retrieved responsive to receiving the permission to retrieve the sensitive data from the customer device.

20. The non-transitory, computer-readable storage medium of claim 16, wherein the at least one attribute associated with the data requester includes a domain name system (DNS) associated with the data requester and/or a server token associated with the system.

* * * * *